Patented Nov. 28, 1950

2,531,485

UNITED STATES PATENT OFFICE 2,531,485

DIAZOTYPES COMPRISING AMINE SALTS OF SULFONIC ACID CONTAINING AZO COMPONENTS

William H. von Glahn, Loudonville, Lester N. Stanley, Delmar, and Margaret A. Hand, Albany, N. Y., assignors to General Aniline & Film Corporation, New York, N. Y., a corporation of Delaware No Drawing. Application April 2, 1947, Serial No. 738,928

5 Claims. (Cl. 95—6)

This invention relates to light sensitive diazotype photoprinting materials and more particularly to such materials having improved wash-fastness properties.

The diazotype process for the production of photoprinting material which will reproduce the image of a design or pattern in a positive print of the original involves the sensitization of a suitable carrier or base such as paper, cellulosic ester or regenerated cellulose films and the like, with a diazo solution. This diazo sensitizing solution which in the case of the paper support is an aqueous solution and in the case of cellulosic films contains organic swelling agents or solvents and plasticizers, may also contain the azo coupling component which upon alkaline development after exposure couples with the diazo compound to form the dye image. If the diazo sensitizing solution contains the azo dye coupling component, as in the case of a so-called two-component system, development can be effected by merely contacting the exposed diazotype surface with ammonia fumes or fumes of volatile amines. If the diazo sensitizing solution does not contain the azo dye coupling component, as in the case of the so-called one-component system or wet development process, then it is necessary to contact the exposed diazotype surface with an alkaline solution of the coupling component. In the latter case, since a strongly alkaline solution is employed with the coupler, solubility of the coupler is not a primary consideration. However, in the case of two-component systems, water solubility of the coupling component is important whether organic solvents are employed in the solution or not. Consequently it is frequently necessary to employ sulfonic acid derivatives of the coupling components in order to insure the necessary solubility. Sulfonated couplers also have the added advantage of possessing a decreased coupling energy as compared with the unsulfonated couplers from which they are derived. This property tends to decrease or minimize the possibility of precoupling of the diazotype materials and thus gives the coated light sensitive layer a better shelf life. Many azo dye coupling components which are selected where it is desirable to produce the image in colors of great depth and brightness of shade also contain one or more sulfonic acid groups.

The desirable properties of coupling components which contain sulfonic acid groups are to some extent offset by the disadvantage that the azo dye resulting from coupling such dye components with the usual light sensitive diazos are not wash-fast and consequently the diazotype prints made from such azo components are very susceptible to bleeding when moistened or accidentally wetted. Also components which are frequently used in diazotypes to produce particularly desired color effects include, for example, 2,3-dihydroxynaphthalene-6-sulfonic acid, R salt (the sodium salt of 2-naphthol-3,6-disulfonic acid), resorcinol monosulfonic acid and F acid (2,7-naphthol sulfonic acid). Diazotype prints which are made from these sulfonic acid containing azo components, although they give excellent results in so far as their color effects and shelf life properties are concerned, are notorious for the lack of wash-fastness of the azo dye image.

It has now been discovered that these azo components containing sulfonic acid groups can be made wash-fast by treating them with amines. Preferably an amine is added to the diazotype coating solution containing the coupler and the light sensitive diazo compound. However, if desired, the azo component and amine may be previously reacted and the combination of the azo component and amine used for precoating or incorporated into a coating solution with the light sensitive diazo compound and other ingredients. Also, the azo component can be precoated onto the carrier and dried, followed by a coating of a mixture of the diazo compound and the amine. The amine can also be incorporated into the base material as a precoating, followed by a coating of the diazotype solution containing the azo component and light sensitive diazo compound. It is believed that the stabilization of the dye resulting from the ultimate development and coupling of the azo component and diazo compound against bleeding is effected by the formation of a water insoluble amine salt of the sulfonic acid group. Amines which have been found particularly useful for this purpose include cyclohexylamine, dicyclohexylamine, morpholine, amyl amine, glycine, quinoline and ethylene diamine.

In the preparation of diazo two-component layers in accordance with this invention, a suitable support, such as paper, cellulose acetate film or other cellulose ester or cellulose ether film or regenerated cellulose film is coated by means known to the art with a light sensitive composition containing a suitable diazo compound or compounds, a coupling component containing at least one sulfonic group in its molecule, an amine of the class consisting of aliphatic amines, such as ethyl amine, amyl amine and ethylene diamine; cycloaliphatic amines, such as cyclohexylamine and dicyclohexylamine; aromatic amines, such as diphenylamine, and heterocyclic amines such as quinoline, together with stabilizing compounds, acids and other adjuvants ordinarily used in the preparation of diazotype two-component light sensitive coating compositions. As for the acids employed for maintaining the proper pH of such coating compositions, it is preferable not to use hydroxy acids, such as citric acid, when using azo components containing sulfo groups. Mineral acids, such as boric and phosphoric acids, are preferable and are especially useful in combination with such azo components. It has also been found advantageous to incorporate thickening materials into the coating solution, such as casein, pectin, starch or polymeric materials such as melamine resins, formaldehyde-urea, and formaldehyde thiourea resins, polyacrylic acid or substances which form resins during drying and storage of coated diazotype material, such as furfuryl alcohol.

As diazo compounds, many of the known diazo compounds which are light sensitive and otherwise suitable for use in two-component diazotype systems may be employed. Those which have been found most suitable for use in two-component systems are those obtained by diazotization of p-diamines of the benzene series, particularly those in which one of the amino groups prior to diazotization is substituted by at least one alkyl, alkoxyalkyl, aryl, aralkyl, alkylol, cycloaliphatic or heterocyclic group. Other diazo compounds have been used, such as those obtained by diazotization of o-diamines of the benzene or naphthalene series in which case one of the amino groups prior to diazotization must be so substituted and those derived from o-aminonaphthols, p-aminonaphthols and 1,4-diamines of the naphthalene series. Examples of such diazo compounds are N-hydroxyethyl-N-methylamino-p-diazo benzene, p-diazo diphenyl amine, 1-monoethylamino-2(or 3)-methyl-4-diazo benzene, 1-N-hydroxyethyl-N-ethylamino-3 - methyl - 4 - diazo benzene, 1-diethylamino-3-ethoxy-4-diazo benzene, 4-diazo-1-benzoylamino-2,5-diethoxy benzene, p-diazo-N-diethylaniline, 1-N,N-dihydroxyethylamino-3-chloro-4-diazo benzene, p-diazo-N-ethyl-N-benzylaniline, p-diazo - N - dimethylaniline, 1-ethylamino-4-diazo benzene, 1-N-hydroxyethyl-N-ethylamino-4-diazo benzene, 1-diazo-2-naphthol-4-sulfonic acid, 2-diazo-1-hydroxy-3,6-naphthalene disulfonic acid, 1-diazo-4-naphthol-2-sulfonic acid, 1-diazo-2-N,N-dimethylamino benzene, 1-diazo-2-N-ethyl-N-hydroxyethylamino benzene, 4-diazo-2,5,4'-triethoxydiphenylene, 1-N N-dihydroxyethylamino-4-diazo benzene and p-phenylenediamine. These diazo compounds may be used in the form of their stabilized salts, such as the $ZnCl_2$, $CdCl_2$ or $SnCl_4$ double salts, fluoroborates, aryl or alkyl sulfonates and acid sulfates of the diazonium compound.

The following examples will serve to illustrate this invention, but are not intended to limit it thereto. Except where otherwise indicated, the parts are by weight.

*Example 1*

Diazotype paper stock is coated with a solution containing the following ingredients per 100 cc. of water:

1.8 grams 2,3-dihydroxy naphthalene-6-sulfonic acid,
2.1 grams diethylamino-p-benzene diazonium chloride $ZnCl_2$ double salt,
5 grams boric acid,
4 grams thiourea,
5 grams methylol thiourea solution (obtained by the condensation of thiourea and 38% formalin, 1 to 1.5 parts by weight, at 25° C.),
6 grams cyclohexyl amine.

The thus coated paper is dried in the usual manner and exposed under a pattern. The exposed image is then developed by contacting it with ammonia fumes, the image being developed to a brilliant blue on a clear white background. This print is then tested for wash-fastness by successively dipping it and removing it ten times in a water bath maintained at 25° C. Under such a test, these prints do not bleed, whereas prints made from an identical solution which does not contain the cyclohexylamine bleed badly when similarly tested.

*Example 2*

Diazotype stock paper is coated with a solution containing the following ingredients per 100 cc. of water:

1.8 grams 2,3-dihydroxynaphthalene-6-sulfonic acid,
2.1 grams diethylamino-p-benzene diazonium chloride $ZnCl_2$ double salt,
10 grams morpholine citrate,
5 grams boric acid,
4 grams thiourea.

The thus coated paper is dried in the usual manner, exposed to light under a pattern and developed by contacting the exposed image with ammonia fumes. The image is developed to a brilliant blue on a clear white background. The print is then tested for wash-fastness by successively dipping and removing it ten times in a water bath maintained at 25° C. When so tested, these prints do not bleed, whereas prints made from a similarly coated material, wherein the coating solution is identical with the coating solution of this example except that it does not contain the 10 grams of morpholine citrate, will bleed badly when similarly tested for wash-fastness.

*Example 3*

Transparentized paper is coated with a solution containing the following ingredients per 100 cc. of water:

2.5 parts resorcinol-4-sulfonic acid,
3.2 parts N-methyl-N-hydroxyethylamino-p-benzene diazonium chloride-$ZnCl_2$ double salt,
6.0 parts morpholine,
5.0 parts boric acid,
4.0 parts thiourea.

The thus coated paper is dried in the usual manner, exposed to light under a pattern and developed by contacting the exposed image with ammonia fumes. The image is developed to a good sepia shade on a clear white background. This print is then tested for wash fastness by successively dipping it and removing it ten times in a water bath maintained at 25° C. Under such a test, these prints do not bleed and exhibit good wash fastness properties. Prints made from an identical solution which does not contain morpholine bleed badly when similarly tested and exhibit poor wash fastness properties.

We claim:

1. A diazotype material comprising a light sensitive diazo compound suitable for two component diazotypes, a non-coupling amine which is capable of salt formation and is selected from the group consisting of alkyl and cyclo-alkyl amines and an azo coupling component selected from the group consisting of phenols and naphthols having at least one sulfonic acid group but no amino groups.

2. The diazotype material of claim 1 wherein the diazo compound is a light sensitive p-amino diazo compound of the benzene series.

3. A diazotype material comprising diethylamino-p-diazo benzene, 2,3-dihydroxynaphthalene-6-sulfonic acid and cyclohexylamine.

4. A diazotype material comprising a light sensitive p-amino diazo compound of the benzene series and a member of the group consisting of alkyl and cyclo-alkyl amine salts of an azo dye coupling component selected from the group consisting of phenols and naphthols having at least one sulfonic acid group but no amino groups.

5. The diazotype material of claim 4 wherein the amine salt of the azo dye coupling component is a cyclohexylamine salt.

WILLIAM H. von GLAHN.
LESTER N. STANLEY.
MARGARET A. HAND.

REFERENCES CITED

The following references are of record in the file of this patent:

UNITED STATES PATENTS

| Number | Name | Date |
|---|---|---|
| 1,803,906 | Krieger | May 5, 1931 |
| 1,989,065 | Schmidt | Jan. 22, 1935 |
| 2,378,583 | Schmidt | June 19, 1945 |
| 2,433,632 | Solomon | Dec. 30, 1947 |

FOREIGN PATENTS

| Number | Country | Date |
|---|---|---|
| 500,658 | Germany | June 24, 1930 |
| 473,244 | Great Britain | Oct. 8, 1937 |
| 670,371 | Germany | Jan. 17, 1939 |